Nov. 25, 1969     E. EISNER     3,480,340

GAS BEARING

Filed Sept. 26, 1967

INVENTOR
E. EISNER
BY
ATTORNEY

United States Patent Office 3,480,340
Patented Nov. 25, 1969

3,480,340
GAS BEARING
Edward Eisner, Gillette, N.J., assignor to Bell Telephone Laboratories, Incorporated, Murray Hill, N.J., a corporation of New York
Filed Sept. 26, 1967, Ser. No. 670,608
Int. Cl. F16c 17/16, 39/04
U.S. Cl. 308—5                                     3 Claims

ABSTRACT OF THE DISCLOSURE

The specification describes a form of gas bearing useful primarily for supporting small wires. The gas flow, rather than supporting the wire directly, creates a lift via the bernoulli effect, which is distributed around the wire to maintain it spaced from the bearing surface.

---

Figure 1:
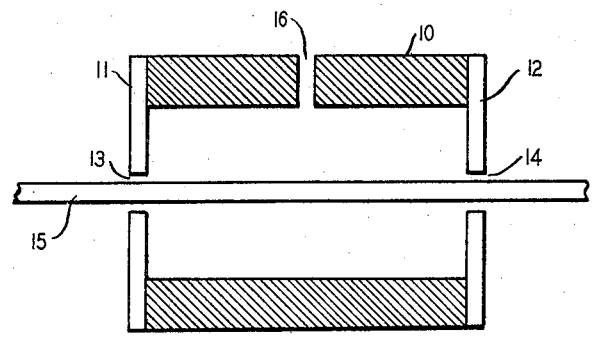

This invention relates to gas bearings for supporting light-weight cylindrical wires or rods.

Conventional gas bearings function by direct application of gas pressure, distributed as equally as possible, to all points on the periphery of the shaft or member being supported. The problems of equalizing the gas pressure and of obtaining an aerodynamically stable system are indeed formidable and these objectives are particularly elusive with simple structures. Gas bearings have become complex devices having rather limited applications.

One of the complicating factors in the design of gas bearings is the low viscosity of the gas in relation to standard lubricants such as grease or oil. It is conventional practice to design the bearing so as to retain the lubricant in the bearing as long as possible. This objective is served by making the bearing surface as large as practical. Since the load capacity of the bearing is directly related to the area of the bearing surface at least two desirable ends are served by a large bearing surface. Accordingly, it has become a basic principle in the design of gas bearings to make the bearing long with respect to the diameter of the opening. It would be conservative to estimate that a cylindrical gas bearing designed in accordance with prior art principles would have an opening in which the radius is less than one-tenth of the height.

Another, and perhaps more troublesome, aspect of the design of gas bearings is aerodynamic stability. This problem is so complex that solutions are typically empirical. Instabilities become more severe and less predictable in turbulent air flow. Consequently typical bearings are designed to avoid abrupt velocity changes in the gas flow. These complications suggest that while many new designs can be theorized, success in practice is largely unpredictable.

In arriving at the discovery on which this invention is based, a new gas bearing design was proposed and successfully demonstrated. This design is specifically adapted for bearings supporting thin, light-weight, cylindrical bodies. Wires or rods weighing less than 0.1 gram per cm. of length and having diameters of less than 0.1 cm. are especially suited for the bearings of this invention. A gas bearing suitable for supporting members of such small dimensions would be difficult or impossible to produce following prior art design principles.

The novel gas bearing consists of a relatively thin sheet of a rigid material containing a hole not substantially larger than the diameter of the member being supported. Means are provided to establish a flow of gas through the annular opening between the hole and the member being supported. This gas flow functions via the Bernoulli effect to position the member in the center of the hole and to maintain the member spaced from the support structure as long as the gas flows. The gas flow is effected by establishing a difference in pressure on one side of the support relative to the other. This can be done by evacuating a closed chamber on one side of the support or, more conveniently, by increasing the pressure in this chamber.

Figure 2:
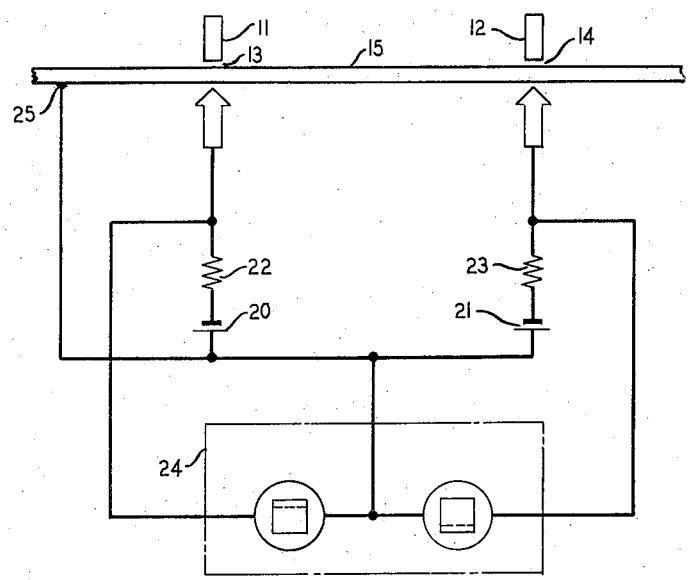

These and other aspects of the invention may become more apparent from a consideration of the following detailed description. In the drawing:

FIG. 1 is a front elevation view, in section, of a bearing constructed according to the principles of this invention; and FIG. 2 is a schematic diagram of a test circuit used to measure the effectiveness of the gas bearing of FIG. 1.

The bearing shown in FIG. 1 consists of a pressure chamber 10 having relatively thin end walls 11 and 12. Holes 13 and 14 are provided in the end walls. The thickness of the end walls is important only to the extent that it determines the thickness of the holes 13 and 14. Obviously, the holes can be countersunk in larger diameter holes in which case the end walls could be relatively thick. The size of the pressure chamber is also relatively unimportant as long as a convenient and steady flow rate through the holes can be maintained. The important parameter is the hole dimension in the axial direction of the wire 15 being supported. This dimension is preferably less than five times the diameter of the hole. The diameter of the hole should preferably not exceed the diameter of the member being supported by more than about 30 percent of the axial length of the bearing (i.e. of the wall thickness, in the simplest case of a uniform wall). With these dimensions the operation of the bearing depends largely on the effect of the gas flow, or Bernoulli effect, rather than on the effect of a distributed pressure in a confined bearing journal as in the bearings of the prior art. Gas is admitted under pressure into the orifice 16 of FIG. 1. It flows out of the chamber through the annular spaces between the wire 15 and the holes 13 and 14. At each hole the wire has an equilibrium position in the center. Any displacement from the center makes the gap narrower on one side of the wire. This reduces the flow rate of the gas and, according to Bernoulli's principle, increases the pressure on that side. Thus, there is net force pushing the wire back towards the center of the hole. However, prior experience with simple gas bearing structures indicated that the system might overcompensate and that an oscillating or dynamic equilibrium would result.

To establish the stability of this gas bearing structure a bearing was constructed consisting of a block of brass one inch square and one and one-half inches long with a half inch diameter hole drilled along its axis. Clamped on both ends of the hole were one and one-half mil (0.0038 cm.) thick sheets of aluminum foil. Before assembly, holes of very nearly the same diameter as the wire to be supported were made by using a piece of the wire itself as the tool in a spark eroder. The wire in this case was a 6 mil (0.015 cm.) diameter wire made of high-carbon steel and was intended for use as the delay element of an ultrasonic delay line. The hole to accommodate the wire was on the order of one-half mil (0.0013 cm.) larger than the wire.

To monitor the effectiveness of the bearing the electrical circuit shown in FIG. 2 was connected to the bearing to detect contacts between the wire 15 and the walls 11 and 12 of the bearing. One and one-half volt batteries 20 and 21 were connected through 31K ohm resistors 22 and 23 to the twin beam oscilloscope 24. Contact to the wire was made at 25. With no contact at either bearing wall the oscilloscope beams each read one and one-half volts. Contact at either bearing wall shunted most of the voltage through the wire with the corresponding oscilloscope registering the drop in voltage.

The bearings were operated successfully at pressures of 0.2 to 2.0 atmospheres. Below 0.2 atmosphere the flow rate was insufficient to support the wire. Above 2.0 atmospheres, turbulence resulted and instabilities became evident. However, these pressures are characteristic of this particualr bearing and the useful range may not be as restrictive for bearings having different dimensions and/or for supporting different loads. However, as long as the dimensions of the bearing remain within the ranges prescribed herein the bearing will function according to the novel principles upon which this invention is based.

The gas used in the bearing is conventional. Air is generally most convenient although the use of inert gases or nitrogen might be favored from the standpoint of reducing corrosion. It is apparent that the bearing will operate vertically as well as horizontally. The bearing of this invention is advantageously used to support members having cross sections other than circular, for instance polygonal or lenticular.

Various additional modifications and deviations of this invention will be apparent to those skilled in the art. All such variations and deviations which basically rely on the teachings through which this invention has advanced the art are properly considered within the spirit and scope of this invention.

What is claimed is:

1. A gas bearing supporting cylindrical wires or rods weighing less than 0.1 gram per centimeter comprising a pressure chamber having at least two parallel sides, at least one circular opening in each of said parallel sides, the openings being aligned on an axis normal to the sides and having a diameter of less than about 0.1 centimeter and a thickness measured in the direction of the aforesaid axis of less than about 0.1 centimeter one of said rods and wires weighing less than 0.1 gram per centimeter and being disposed in said chamber and extending through said openings, and means independent of said openings admitting gas under pressure into the chamber.

2. A bearing according to claim 1 wherein the diameter of the circular openings is sufficiently larger than the diameter of the cylindrical wire or rod that the gas flow is sufficient to substantially support the wire by the Bernoulli effect.

3. A bearing acocrding to claim 1 wherein:
the cylindrical wire or rod is 6 mils (about 0.015 cm.) in diameter;
the circular holes are 6.5 mils (about 0.016 cm.) in diameter and 1.5 mils (about 0.004 cm.) thick; and
the applied pressure is between 0.2 and 2.0 atmospheres.

References Cited

UNITED STATES PATENTS

| | | | |
|---|---|---|---|
| 3,030,744 | 4/1962 | Mueller | 308—9 X |
| 3,082,013 | 3/1963 | Thielenhaus | 308—9 X |
| 3,103,850 | 9/1963 | Khoury | 226—97 X |
| 3,112,140 | 11/1963 | Adams | 308—122 |
| 3,191,835 | 6/1965 | Fenn | 226—97 |
| 3,319,859 | 5/1967 | Miller | 226—97 |
| 3,321,254 | 5/1967 | Dock | 308—9 |
| 3,326,453 | 6/1967 | Kun | 308—9 |

MARTIN P. SCHWADRON, Primary Examiner

L. L. JOHNSON, Assistant Examiner

U.S. Cl. X.R.

308—9